United States Patent [19]
Aahlad

[11] Patent Number: 5,907,675
[45] Date of Patent: *May 25, 1999

[54] METHODS AND APPARATUS FOR MANAGING DEACTIVATION AND SHUTDOWN OF A SERVER

[75] Inventor: Yeturu Aahlad, Sunnyvale, Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/408,627

[22] Filed: Mar. 22, 1995

[51] Int. Cl.$^6$ ..................................................... G06F 13/00
[52] U.S. Cl. ................................ 395/200.33; 395/200.57
[58] Field of Search ..................................... 395/650, 700, 395/672, 673, 674, 800, 670–678, 680.85, 200.33, 200.57; 364/246.8

[56] References Cited

U.S. PATENT DOCUMENTS

| | | | |
|---|---|---|---|
| 5,057,996 | 10/1991 | Culter et al. | 364/200 |
| 5,129,083 | 7/1992 | Culter et al. | 395/600 |
| 5,136,712 | 8/1992 | Perazzoli et al. | 395/700 |
| 5,187,790 | 2/1993 | East et al. | 395/725 |
| 5,241,673 | 8/1993 | Schelvis . | |
| 5,297,283 | 3/1994 | Kelly, Jr. et al. | 395/650 |
| 5,321,841 | 6/1994 | East et al. | 395/725 |
| 5,329,619 | 7/1994 | Page et al. | 395/200 |
| 5,418,945 | 5/1995 | Carter et al. | 395/600 |
| 5,455,958 | 10/1995 | Flurry et al. | 395/800 |
| 5,553,239 | 9/1996 | Heath et al. . | |
| 5,596,745 | 1/1997 | Lai et al. | 395/614 |
| 5,598,562 | 1/1997 | Culter et al. | 395/674 |
| 5,615,362 | 3/1997 | Jensen et al. . | |

FOREIGN PATENT DOCUMENTS

| | | | |
|---|---|---|---|
| 0 501 610 A3 | 2/1992 | European Pat. Off. | 9/44 |
| 501 610 A3 | 2/1992 | European Pat. Off. | G06F 9/44 |

OTHER PUBLICATIONS

"Advanced Windows NT", Microsoft Press 1993 by Jeffrey Richter.

Operating System/2 Local Area Network Server, Network Administrator Reference vol. 3, Network Administrator Tasks, Version 2.0, 1991, International Business Machines Corporation, US XP002007352, pp. 10–15, line 1–line 22.

IBM Technical Disclosure Bulletin 700, vol. 38, No. 1, Jan. 1995, Armonk, NY, US, pp. 583–584, XP000498876, "Mechanism for Dynamic Resource Management."

(List continued on next page.)

*Primary Examiner*—Lucien U. Toplu
*Assistant Examiner*—Alice Park
*Attorney, Agent, or Firm*—David P. Lentini; Beyer & Weaver

[57] ABSTRACT

A number of methods and apparatus for managing clients of a computer server. In particular, the usher implements an orderly and predictable server deactivation and/or shut down strategy in generally the following manner. The usher continuously maintains a transaction counter indicative of the number of clients actively utilizing services. For example, the usher may increment the transaction counter when a service is requested and then decrement the transaction counter when a service is completed or terminated. However, at some point in the server operation, the usher may receive a lock up request. This may occur because a client has invoked a deactivation and/or shut down operation, or the server may decide to shut down itself. In any event, upon receiving the lock up request, the usher will not perform any new client requests. Thus the usher controls the accessibility of the server to external clients by preventing new client requests for service in preparation for shut down. Nevertheless, the usher utilizes a gentle strategy and only eliminates clients through attrition. Hence the usher implements a shut down strategy which, while not accepting new client requests, will complete any services active at the time deactivation and/or shut down was requested. In some embodiments of the present invention, an usher is an internal component of or is used by a server such as a computer process, a computer service, or a target object.

51 Claims, 9 Drawing Sheets

OTHER PUBLICATIONS

IBM Technical Disclosure Bulletin, vol. 34, No. 8, Jan. 1992, Armonk, NY, US, pp. 172–174, XP000302082, Adaptive Lock Escalation/De–Escalation.

Unknown, "Operating System/2 Local Area Network Server, Network Administrator Reference vol. 3: Network Administrator Tasks," Oct. 1991, International Business Machines Corp.

Unknown, "Mechanism for Dynamic Resource Management," IBM Technical Disclosure Bulletin, vol. 38, No. 1, Jan. 1995, Armonk, NY.

Unknown, "Adaptive Lock Escalation/De–Escalation," IBM Technical Disclosure Bulletin, vol. 34, No. 8, Jan. 1992, Armonk, NY.

METHODS AND APPARATUS FOR MANAGING DEACTIVATION AND SHUTDOWN OF A SERVER

BACKGROUND OF THE INVENTION

The present invention relates to the fields of distributed computing systems, client-server computing and object-oriented programming. More specifically, the present invention teaches methods and apparatus for managing deactivation and shutdown of a server resident in a distributed object operating environment. Some specific server examples contemplated by the present invention include a computer process, a computer service including a collection of objects, or a single object.

Object oriented programming methodologies have received increasing attention over the past several years in response to the growing tendency for software developed using traditional programming methods to be delivered late and over budget. This stems from the fact that traditional programming techniques that emphasize procedural models and "linear" code tend to be difficult to design and maintain in many circumstances. Generally, large programs created using traditional methods are "brittle". That is, even small changes can effect numerous elements of the programming code. Thus, minor changes made to the software in response to user demands can require major redesign and rewriting of the entire program.

Object oriented programming strategies tend to avoid these problems because object methodologies focus on manipulating data rather than procedures; thus providing the programmer with a more intuitive approach to modeling real world problems. In addition objects encapsulate related data and procedures so as to hide that information from the remainder of the program by allowing access to the data and procedures only through the object's interface. Hence changes to the data and or procedures of the object are relatively isolated from the remainder of the program. This provides code that is more easily maintained as compared to code written using traditional methods, as changes to an object's code do not affect the code in the other objects. In addition, the inherent modular nature of objects and interfaces allows individual objects and interfaces to be reused in different programs. Thus, programmers can develop libraries of "tried and true" objects that can be used over and over again in different applications. This increases software reliability while decreasing development time, as reliable programming code may be used repeatedly.

A more recent advance in the field of object oriented methodologies has been the implementation of distributed object operating environments over computers interconnected via a computer network. As used herein, the term "distributed object" or "object" refers to an encapsulated package of code and data that can be manipulated by operations through an interface. Thus, distributed objects will be seen by those skilled in the art of object oriented programming (OOP) as including the basic properties that define traditional programming objects. However, distributed objects differ from traditional programming objects by the inclusion of two important features. First, distributed objects are multilingual. That is, the interfaces of distributed objects are defined using an interface definition language that can be mapped to a variety of different programming languages. One such interface definition language is Object Management Group's IDL. Second, distributed objects are location-independent, i.e., distributed objects can be located anywhere in a network. This contrasts sharply with traditional programming objects which typically exist in a single address space.

In general, distributed objects can be client objects or server objects, depending upon whether they are sending requests to other objects or replying to requests from clients. In a distributed object environment, requests and replies are made through an Object Request Broker (ORB) that is aware of the locations and status of the objects. One architecture which is suitable for implementing such an ORB is provided by the Common Object Request Broker Architecture (CORBA) specification. The CORBA specification was developed by the Object Management Group (OMG) to define the distributed computing environment world in terms of objects in a distributed client-server environment, where server objects are capable of providing services to clients requesting the service. In the following discussion, the terms "object" and "distributed object" will be used interchangeably.

Typically a server object can provide services to any entity which can request services. Therefore a client is defined herein as an entity requesting a service of an object. For example, a client may be an object residing in the same computer process as the server object or a computer process executing on a remote computer. In the preceding paragraphs we have termed an object providing service to a client a "server object." However, a more well known phrase for an object providing service to a client is "target object." Thus hereinafter the phrase "target object" will be used when the server under discussion is an object or a distributed object.

Elaborating further on the terminology of client-server interactions, a client will "call" a target object to "invoke" a "method" that is executed by the target object. Note that while "call" and "invoke" can carry slightly different meanings, herein the two terms are used interchangeably and their meanings will be understood from the context of the discussion herein. As is well known to those of skill in the art, a method is a procedure contained within an object which is made available to other entities, i.e. clients, for the purpose of requesting services of that object. Thus the object performing the service for the client is the server, hence the phrase client-server. In calling a method, the client may also pass those arguments, also referred to as parameters, necessary for the target object to perform the requested method. Please note that the previous term "method" is a term of the art of object oriented programming and differs from the term "method" classically used in drafting patent applications. However, for the sake of clarity, the phrases "operation" or "object operation" will be used in lieu of "method" hereinafter.

As will be appreciated by those skilled in the art of object oriented programming, target objects and can be thought of as resources available to clients. For example, an object could be a printer available to a multiplicity of clients in a computer network. The printer object may have operations such as "print document" or "shut down network connection." In turn, the printer object operations may require arguments such as "document type" (i.e. text, postscript, etc.), "quantity", "orientation", and "paper size." In another example, an object is a database object. The database object may have operations such as "read", "write", or "delete." The database object operations may require appropriate arguments such as "addressing", "password", or "format."

In normal situations (such as the printer object and the database object) resources can be shut down or otherwise made unavailable. By way of example, a printer object may be turned off thus becoming unavailable to clients. As another example, a database object might close to enable a data backup or a software upgrade. In a final example, an operating system may decide, based on a variety of criteria, that a specific object has outlived its usefulness and therefore should be eliminated. In each of these cases, as in any shut down scenario, there is a likelihood that clients are actively requesting services concurrent to the requested shut down.

Non-invasive shut-down and/or deactivation of a resource requires a sophisticated mechanism. One might imagine that orderly and predictable shutdown strategies are commonplace. However, this is not the case. Take, for example, the case of the printer object. Prior art for shutting down a printer includes an on/off power switch. When an operator (the client) of the printer turns the printer of, any print job (the requested service) is typically aborted immediately, resulting in a loss of print data and an unfinished print job.

Even advanced printing systems require a large degree of supplementary user support to perform a less than adequate service. Take for example, a Macintosh computer running under the Macintosh Operating System Version 7.5 printing to a standard laser printer. If the printer is turned off or becomes unavailable during the print job, the print job is aborted and the printing system displays a message to the computer user that the print job has aborted. This requires the operator to figure out and solve the problem (perhaps the computer administrator shutdown the network without warning) and then start the print job over. Or perhaps the Macintosh user wishes to shutdown the computer but the print job is still downloading data. The operating system warns the user and allows the user to (manually) either (1) terminate the print job, (2) perform the print job at a later time, or (3) leave the machine on until the print job is done.

The case of the database object is similar to that of the printer object. The prior art does not teach a shut down strategy which is non-invasive in regards to the services the database object provides to the database clients. For example, if a database object is shut down while a client is writing, data is lost and the state of the database and the state of the database client may no longer be consistent with one another.

The dilemmas of the aforementioned scenarios are commonplace in the multitude of computer applications having client-server interactions. Furthermore, effective, non-invasive resource shut down strategy is critical in systems wherein many of the features are intended to be fully automatic. In fact, in the aforementioned scenarios, the goal is to provide a fully automated service (such as printing) and this goal is not truly achieved. As is well understood by those skilled in the art of object oriented programming, the aforementioned modularity of objects makes the client-server interaction ubiquitous within the distributed object operating environment. Hence not having an orderly and predictable resource shut down strategy in a distributed object operating environment may be a handicap. What is needed is an orderly and predictable resource deactivation and/or shut down strategy. This strategy should be based on an underlying protocol which enables its use with a variety of different resources. It should be for use with all types of servers such as computer processes, services, and single objects. In particular, the shut down strategy must take advantage of the inherent qualities of objects to produce a generic solution for implementation across a large number of different types of objects.

SUMMARY OF THE INVENTION

To achieve the foregoing and other objectives and in accordance with the purpose of the present invention, methods, apparatus and data structures for ushering clients of an object are disclosed. In a first aspect, a computer implemented method for managing clients of a server is disclosed. By way of explanation, the server is responsive to both service requests from various clients and to deactivation requests. The method includes computer controlled steps such as responding to a service request by determining whether the server is in a locked state and if the server is in the locked state it does not handle the service request, but if it is in a unlocked state it can handle service request and therefore performs the requested service. Furthermore, if it is determined that the server is in an unlocked state, a transaction counter indicative of the number of service requests actively utilizing the server is incremented by a predetermined value. When a requested service completes, the transaction counter is decremented by the predetermined value. In response to a deactivation request, the server is set to the locked state and the transaction counter is checked to determine whether there are any active service requests. If it is determined that there is at least one active service request, then the server is not deactivated until all of the active service requests have been completed. Thus, when the server is to be deactivated, new service requests are refused and existing service requests are completed prior to deactivation.

In related method aspects, the server may be a server computer process, a server object, or a computer service having a plurality of objects working together to provide the service. In another related aspect, the server responds to a service request by invoking a check in operation which accomplishes the locked state determining and the transaction counter incrementing steps. In additional embodiments, the state of the server is indicated by a lock flag and the check in operation further returns the state of the lock flag to the server.

In another related aspect, when a requested service is completed, the server invokes a check out operation which accomplishes the transaction counter decrementing step. In yet another related aspect of the present invention, the server responds to a deactivation request by invoking a lock up operation which accomplishes the setting the server to the locked state step. In still another related aspect, the server responds to a deactivation request by invoking a flush operation which checks the transaction counter to determine if there are active service requests. If there is at least one active service request, the flush operation will also block the thread of execution associated with itself and, in response to a wake up broadcast, the flush operation will unblock.

A separate aspect of the present invention teaches a computer implemented method for managing clients of a server that is arranged to provide services to a plurality of clients, the server being responsive to service requests from various clients and deactivation requests, the method including the computer controlled steps of responding to each service request by invoking a check in operation, the check in operation including the computer controlled steps of determining whether the server is in a locked state, wherein when the server is in the locked state the server may not handle the service request and when the server is in an unlocked state the server may handle the service request, and incrementing a transaction counter by a predetermined value when it is determined that the server is in the unlocked state, the transaction counter being indicative of the number of service requests actively utilizing the server. The method also teaches the steps of performing the requested service when it is determined that the server is in the unlocked state, responding to a service request completing by invoking a check out operation that decrements the transaction counter by the predetermined value, responding to a deactivation request by invoking a lock up operation that sets the server to the locked state, wherein in the locked state the server completes all active service requests but rejects new service requests and responding to a deactivation request by performing any necessary deactivation functions and then invoking a flush operation that checks the transaction counter to determine whether there are any active service requests prior to deactivating the server, wherein when it is determined that there is at least one active service request, the server is not deactivated until the all of the active service requests have been completed. Thus when the server is to be deactivated, new service requests are refused and existing service request are completed prior to deactivation.

In an apparatus aspect of the present invention, an usher device for use on a computer system is taught. The usher device is arranged to manage a plurality of clients of a computer server and further assist in an orderly shutdown of the computer server. In some embodiments the usher includes a transaction counter indicative of the number of client service requests actively utilizing the computer server, a check in device operable to increment the transaction counter by a predetermined value, a check out device operable to decrement the transaction counter by the predetermined value, and a lock up device operable to lock up the computer server such that when the computer server is locked up it does not accept new client service requests but continues performing any active service requests.

In some embodiments the usher device is resident within the computer server. In different embodiments the usher device is resident external to the computer server. Related embodiments teach a computer system having a central processing unit, a memory device accessible by the central processing unit, and an usher device as described in the preceding paragraph. The computer system may also include an input/output device coupled to at least one of the central processing unit and the memory device. A distributed object operating environment is also taught having a plurality of computer systems as discussed in this paragraph and a computer network interconnecting the computer systems.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

Figure 1:
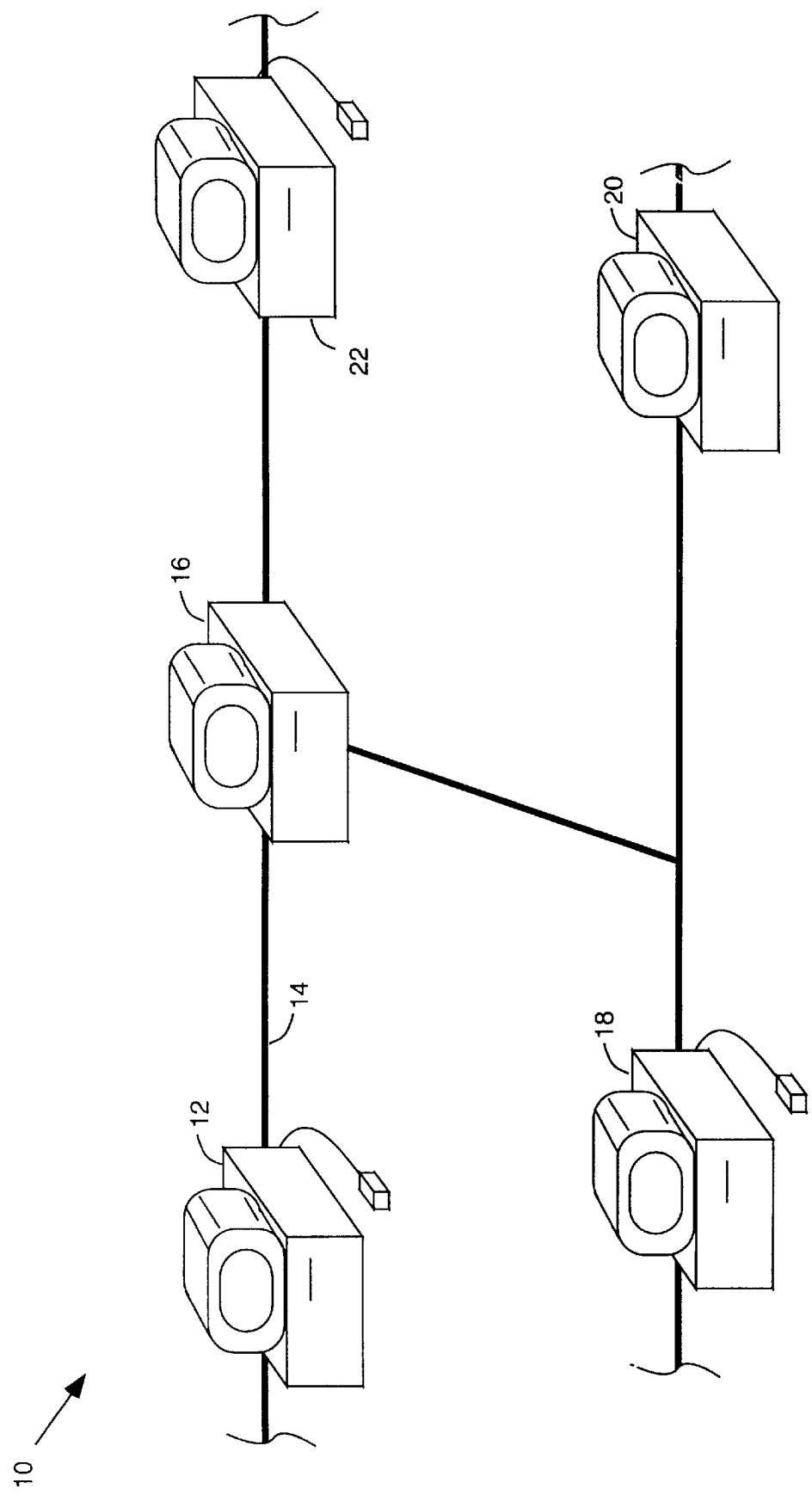
FIG. 1 is a pictorial illustration of various computers linked together in a computer network.

The present invention relates to a distributed operating environment based on object oriented programming (OOP). More specifically, this invention discloses methods, apparatus, and data structures for ushering clients of a service. In the discussion following the definition of terms, the methods, apparatus, and data structures will be discussed in more detail, first through discussing example computer systems which are suitable for the present invention, next continuing with a detailed description of several embodiments of the apparatus and data structures of the present invention, and then further through the detailed description of the method aspects of the present invention.

I. DEFINITION OF TERMS

As used herein, the term "distributed object" or "object" refers to an encapsulated package of code and data that can be manipulated by operations through a defined interface that is associated with an object. Thus, distributed objects will be seen by those skilled in the art as including the basic properties that define traditional programming objects. However, distributed objects differ from traditional programming objects by the inclusion of two important features. First, distributed objects are multilingual. The interfaces of distributed objects are defined using an interface definition language that can be mapped to a variety of different programming languages. One such interface definition language is OMG's IDL. Second, distributed objects are location-independent, i.e., distributed objects can be located anywhere in a network. This contrasts sharply with traditional programming objects which typically exist in the same address space as the client. Distributed objects can be object clients or object servers, depending upon whether they are sending requests to other objects or replying to requests from other objects. Requests and replies are made through an Object Request Broker (ORB) that is aware of the locations and status of the objects.

A "distributed object system" or "distributed object operating environment" refers to a system comprising distributed objects that communicate through an ORB.

An "object reference" or "object" is an object that contains a pointer to another object. Additionally, an object can include a portion of memory (the "sub-object identifier") which can be used for identifying a sub-object. With the exception of the sub-object identifier, the creation and definition of object references will be familiar to those skilled in the art.

An object "class" is a template from which an object can be created. It is used to specify the behavior and attributes common to all objects of this class.

The mechanism by which new classes are defined from existing classes is "inheritance." "Subclasses" of a class inherit operations of their parent class. "Inheritance" is also one mechanism by which reusability is facilitated.

A "client" as defined herein refers to an entity that sends a request to an object. In this model, the object is referred to as a "server object" or a "target object". Thus, clients invoke operations, or implementations, from servers. In a distributed object environment, clients need not have knowledge of the implementation programming language, nor does the implementation have to have knowledge of the client's programming language due to the requirement for a multilingual character of such objects. Clients and servers in distributed object operating environments need only communicate in terms of the interface definition language. As noted above, the request by the client to the server object, and the server object's reply to the client, is handled by the ORB. It should be pointed out that the client and server object can exist within the same process, on the same host computer, or on two different host computers and may even reside in two different object operating environments.

An "object interface" is a specification of the operations, attributes, and exceptions that an object provides. Preferably, object interfaces for distributed objects are written using IDL. As noted above, objects perform transactions through their interfaces. The use of interfaces therefore relieves the need of objects that are aware of the programming languages used to define the operations and data of the objects in the transaction.

To "marshal" a packet of information is to prepare this information for transfer both over a network communications line or via shared memory. This often means organizing the data in a particular format in accordance with the network communications protocol being used.

To "unmarshal" a packet of information is to essentially reverse the marshaling procedure and produce data in a format which is meaningful in a non-network environment.

II. USHERING CLIENTS

In the present invention, an usher is an internal component of or is used by a server such as a computer process, a computer service, or a target object. The usher implements an orderly and predictable server deactivation and/or shut down strategy in generally the following manner. The usher continuously maintains a transaction counter indicative of the number of clients actively utilizing services. For example, the usher may increment the transaction counter when a service is requested and then decrement the transaction counter when a service is completed or terminated. However, at some point in the server operation, the usher may receive a lock up request. This may occur because a client has invoked a deactivation and/or shut down operation, or the server may decide to shut down itself. In any event, upon receiving the lock up request, the usher will not perform any new client requests. Thus the usher controls the accessibility of the server to external clients by preventing new client requests for service in preparation for shut down. Nevertheless, the usher utilizes a gentle strategy and only eliminates clients through attrition. Hence the usher implements a shut down strategy which, while not accepting new client requests, will complete any services active at the time deactivation and/or shut down was requested.

Additionally, rather than shutting down immediately when the transaction counter indicates that there are no active services, the usher waits upon a deactivation command termed flush. Through the two step shut down procedure (i.e. lock then flush), the usher can prevent new clients from utilizing the server yet still perform any required internal operations prior to deactivation. On the other hand, if a flush operation is invoked upon the usher when services are active, the usher will block its own thread of execution and wait until it receives an unblock broadcast. Subsequent to the unblock broadcast, the usher will verify that the transaction counter indicates that no services are active, and if so, then deactivate and/or shut down the server appropriately.

A server having an usher and the clients of the server may be a variety of entities such as computer processes and objects. In particular, distributed objects are contemplated. Distributed objects, as contemplated by the present invention, are implemented (by the ORB and/or the host computer) under computer processes. Computer processes provide a well known and common framework under which computer systems implement different threads of execution. Additionally, the usher strategy of the present invention is well suited for deactivation and/or shutdown of computer processes.

By way of analogy, a computer process can be thought of as a domain partitioned within a computer system. In actuality, a computer process typically includes address space (i.e. a portion of computer memory allocated to only the process), a set of file descriptors, a process identification number, and one or more threads of execution (often referred to as threads). Multi-process and multi-threaded systems, such as contemplated by the present invention, allow for multiple threads to run concurrently in a single process and further allow multiple processes to execute concurrently on a single computer system. For a more detailed description of threads, multi-threaded processes, and principles of concurrency, please see "Concurrency Within DOE Object Implementations" by Dr. Robert Hagmann, Version 0.91, May 27, 1993, published by SunSoft and incorporated herein by reference in its entirety.

In a preferred embodiment of the present invention, distributed objects and computer processes are resident on one or more computers linked together by a network. The network may take any suitable form. By way of example, a representative network arrangement 10 is illustrated in FIG. 1. The network arrangement 10 includes a first computer 12 which is coupled to a transmission line 14. The network 10 further includes a network server, router or the like 16 in addition to other computers 18, 20, and 22 such that data and instructions can be passed among the networked computers. The design, construction and implementation of computer networks will be familiar to those of skill in the art.

Figure 2:
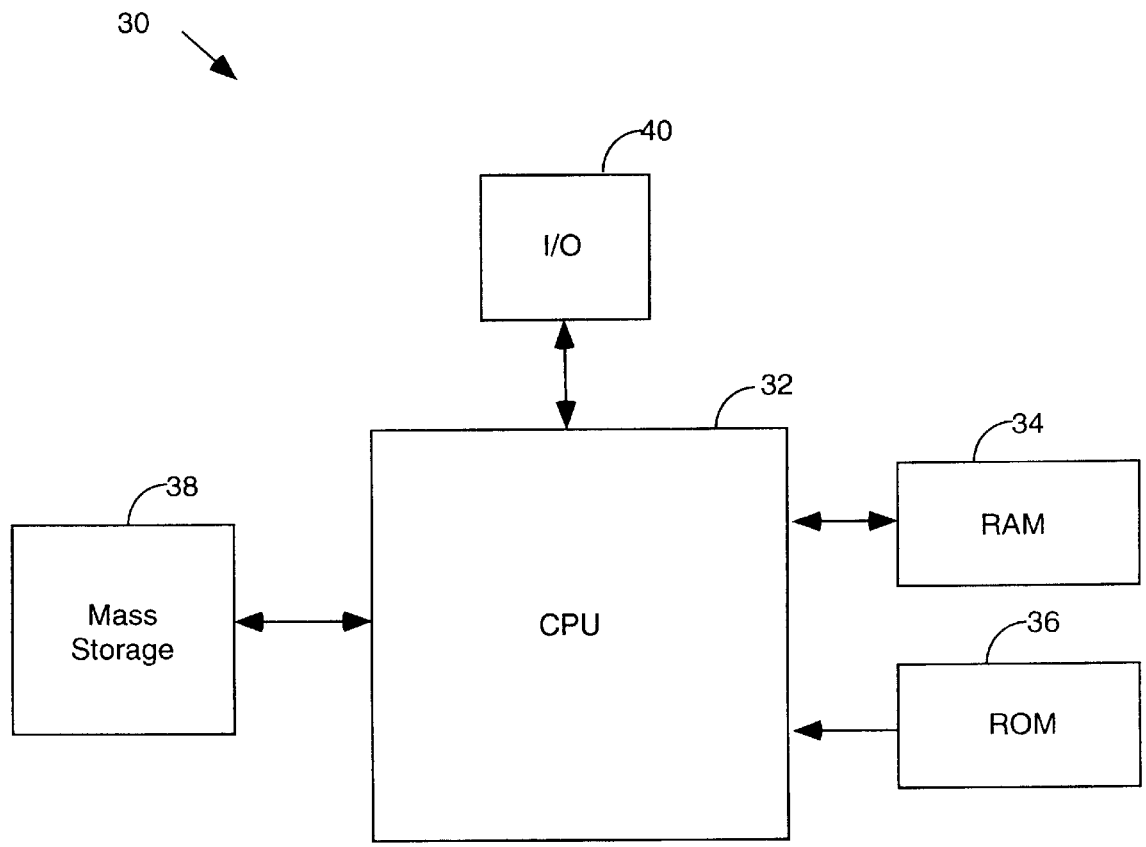
FIG. 2 illustrates diagramatically the major components of a computer in FIG. 1.

A representative computer 30 suitable for use as computers 12, 18, 20, and/or 22 of FIG. 1 is illustrated schematically in FIG. 2. Computer 30 includes a central processing unit (CPU) 32 which is coupled bidirectionally with random access memory (RAM) 34 and unidirectionally with read only memory (ROM) 36. Typically, RAM 34 is used as a "scratch pad" memory and includes programming instructions and data, including distributed objects and their associated code and state, for processes currently operating on CPU 32. ROM 36 typically includes basic operating instructions, data and objects used by the computer to perform its functions. In addition, a mass storage device 38, such as a hard disk, CD ROM, magneto-optical (floptical) drive, tape drive or the like, is coupled bidirectionally with CPU 32. Mass storage device 38 generally includes additional programming instructions, data and objects that typically are not in active use by the CPU, although the address space may be accessed by the CPU, e.g., for virtual memory or the like. Each of the above described computers optionally includes an input/output source 40 that typically includes input media such as a keyboard, pointer devices (e.g., a mouse or stylus) and/or network connections. Additional mass storage devices (not shown) may also be connected to CPU 32 through a network connection. It will be appreciated by those skilled in the art that the above described hardware and software elements, as well as networking devices, are of standard design and construction, and will be well familiar to those skilled in the art.

Figure 3:
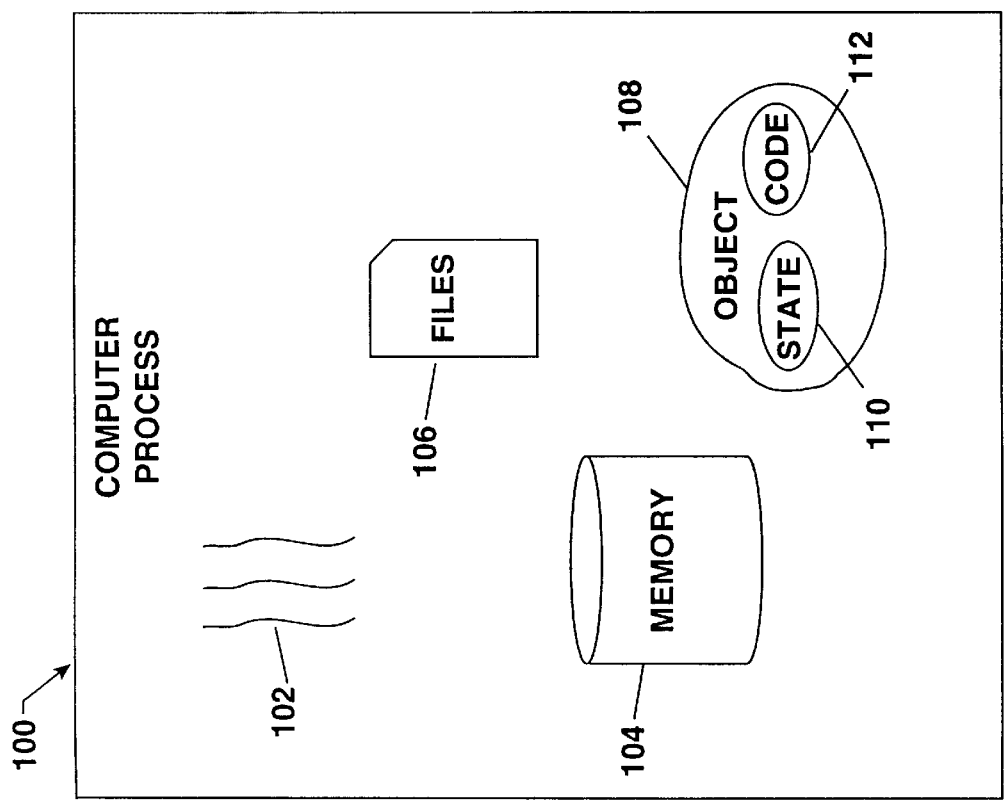
FIG. 3 is a pictorial illustration of a process in accordance with one embodiment of the present invention, wherein the process has multiple threads of execution, file identifiers, memory allocation, and an object resident therein.

FIG. 3 illustrates a multi-threaded process 100 in accordance with one embodiment of the present invention. The process 100 may be implemented on a computer such as computer 30 and includes multiple threads such as thread 102, allocated memory 104 which may include both persistent and transient memory, file identifiers 106, and an object such as object 108. The object 108 includes state 110 and code 112. The object 108 is typically defined by the state 110 and the code 112. Code 112 is essentially the operating instructions by which the object executes. State 110 is thus the remaining portion which is not executable code.

A server in accordance with one embodiment of the present invention is a target object such as object 108 of FIG. 3. In this embodiment, clients of the server would "call" the target object to "invoke" an "operation" of the target object. As will be appreciated by those skilled in the art, "operations" (or object methods) are services provided by the target object to requesting clients. Suitable clients of the target object include objects resident in the same process, objects resident in a remote process, computer processes executing on the same computer system, and computer processes executing on a remote computer.

Figure 4:
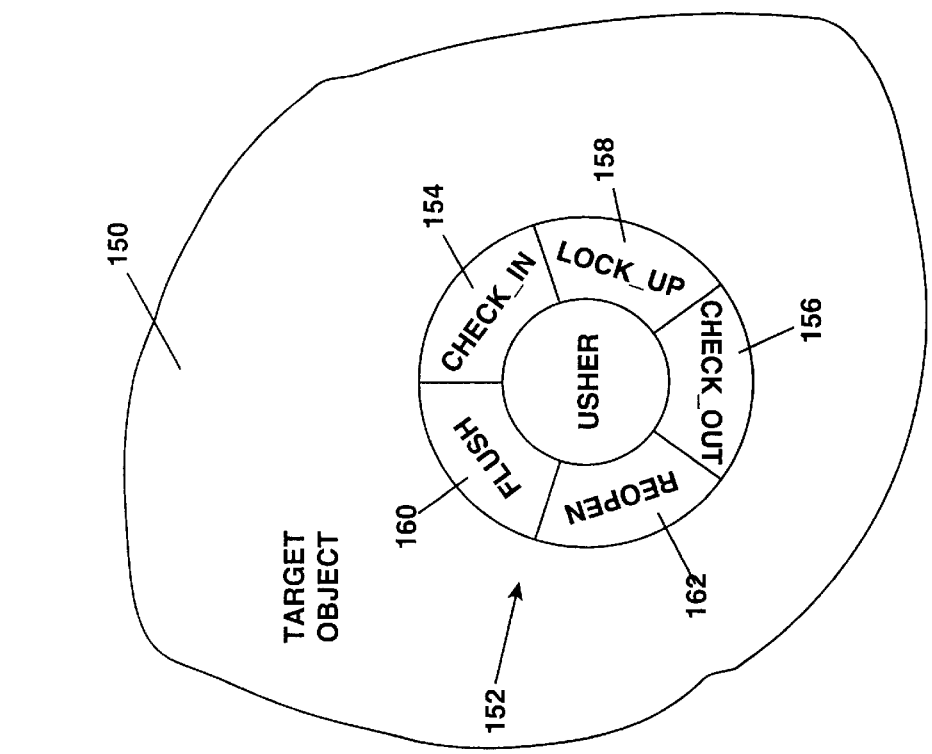
FIG. 4 is a pictorial illustration of a target object in accordance with one embodiment of the present invention, said target object including an usher having the object operations check_in, check_out, lock_up, flush, and reopen.

FIG. 4 illustrates a target object 150 having an usher 152 in accordance with one embodiment of the present invention. The usher 152 includes object operations check_in 154, check_out 156, lock_up 158, and flush 160. The usher 152 optionally includes an object operation reopen 162. In preferred embodiments the object operations provide the mechanisms by which the usher implements the orderly and predictable shut down strategy of the present invention. The object operations will be discussed in more detail immediately following the description of FIG. 5.

As will be apparent to those skilled in the art, two critical tasks in the implementation of the strategy of the present invention are (1) the serialization of the multiple requests received by the usher and (2) the effective sharing of the usher by the different threads of execution generated by the multiple requests. In essence, an usher must be multi-thread safe. As will be appreciated, the synchronization of a multithreaded system is often a daunting task.

Synchronization objects, a common tool for synchronizing multithreaded systems, provide variables which may be accessed by multiple processes and/or multiple threads. Thus different threads in a single process (or multiple processes) can synchronize in spite of the fact that they are typically unaware of one another's existence. Well known examples of synchronization variables include mutual exclusion locks (referred to hereinafter as mutexes), condition variables, reader/writer locks, and semaphores. Some advantages of using synchronization variables are (1) two or more threads can use a single synchronization variable jointly and (2) synchronization variables insure consistency of the shared data.

In explanation, a mutex is created to correspond to a piece of code, a portion of data, some state, etc. When a first thread locks a mutex, all other threads are prevented from executing the piece of code or accessing the portion of state corresponding to the mutex. When a thread has locked a mutex, it is said to "own" the locked mutex. In order for other threads to own the mutex, the first thread (i.e. the thread that locked the mutex) must unlock it. Thus mutexes provide a mechanism by which the programmer can control the serialization of multiple threads, ensuring that steps occur in a desired order and that the state corresponding to the mutex is maintained in a consistent manner.

Condition variables are used (typically in conjunction with a corresponding mutex) to atomically block a thread (or threads) until a specified condition is met. Some typical operations which may be performed by a thread when it owns a mutex associated with a condition variable include evaluating a state of an associated variable, changing a state of an associated variable, blocking ones own thread on the condition variable, asserting a wait timer, and broadcasting a wakeup message to threads blocked on the condition variable. As an example, a first thread may lock a mutex, evaluate a variable associated with the mutex and determine that it needs to wait until the state of the variable changes before proceeding. The first thread will then block itself on the condition variable, simultaneously releasing the mutex. Subsequently, a second thread may lock the mutex, change the state of the variable, and then broadcast on the associated condition variable. As a result, the first thread will wake up in possession of the mutex, reevaluate the variable and proceed accordingly. Synchronization objects are discussed in more depth in the document "Multithreaded Programming Guide", 1994, published by SunSoft, which is incorporated herein by reference in its entirety.

Figure 5:
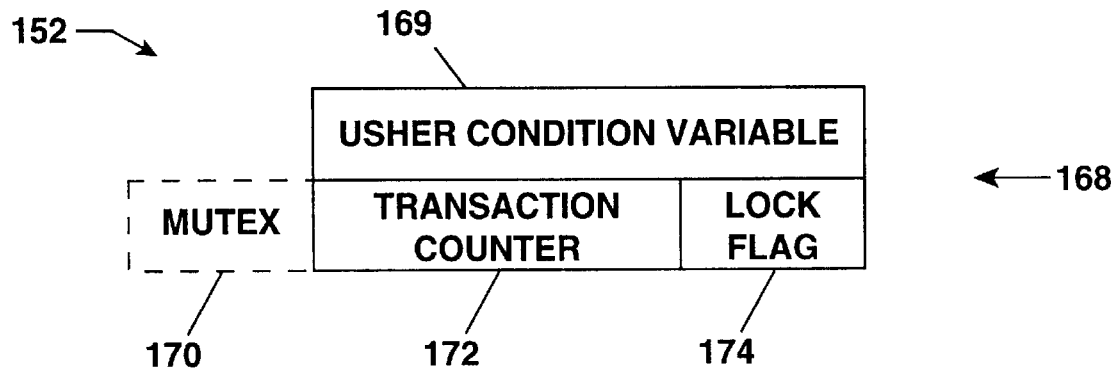
FIG. 5 is a pictorial illustration of one embodiment of a data structure for the usher of FIG. 4, the usher data structure having a corresponding usher mutex, a transaction counter, and a lock flag.

FIG. 5 illustrates one embodiment of an usher data structure 168 which is included in the usher 152 of FIG. 4. The usher data structure 168 has elements such as an usher condition variable 169, an usher mutex 170, a transaction counter 172, and a lock flag 174. The usher condition variable 169 operates as described in the preceding paragraph. The usher mutex 170 controls access to the elements of the usher data structure 168 such that only the thread which owns the usher mutex 170 can read, write, or perform other operations upon the elements. The transaction counter 172 holds a value indicative of the number of service requests the target object is implementing. In one suitable embodiment, the transaction counter is an integer which is incremented or decremented by a predetermined number (such as unity) appropriately. The lock flag 174 indicates if target object services are available to clients. By way of example, the lock flag 174 may be a Boolean variable taking on the values TRUE (unity) or FALSE (zero) implemented as a single bit in the computer system. In preferred embodiments, access to the usher data structure 168 is further limited such that only usher operations (such check_in 154, check_out 156, etc.) may use it.

In various embodiments the elements of FIG. 5 are utilized by the usher object operations of FIG. 4. In one embodiment the operation check_in 154 is operable to lock the usher mutex 170, evaluate the lock flag 174, unlock the mutex 170 and then return the value of the lock flag 174 to the object. If the lock flag 174 is TRUE, the usher 152 will not increment the transaction counter 172 and the target object will not provide the requested service to the client. In preferred embodiments the target object returns an appropriate message to the client indicating that services will not be provided. If the lock flag 174 is FALSE, the usher 152 increments the transaction counter 172 by a predetermined value and the target object performs the client requested service.

In another embodiment the operation check_out 156 is operable to lock the usher mutex 170, decrement the transaction counter 172 by a predetermined value, and evaluate the transaction counter 172. If the transaction counter 172 indicates that the target object is not implementing any client requested services, then the usher 152 will unblock the operation flush 160 by broadcasting on the condition variable 169. In either case, the usher will subsequently unlock the usher mutex 170.

In a further embodiment the operation lock_up 158 is operable to lock the usher mutex 170, set the lock flag 174 to indicate that the target object services are not available to clients (e.g. set lock flag 174 to unity), return the status of the lock flag 174, and then unlock the usher mutex 170. In a still further embodiment the operation reopen 162 is operable to lock the usher mutex 170, set the lock flag 174 to indicate that the target object services are available, and then unlock the usher mutex 170. In yet another embodiment, the operation flush 160 is operable to lock the usher mutex and evaluate the transaction counter 172. If services are active, the operation flush 160 will simultaneously unlock the usher mutex 170 while blocking on the condition variable 169 the operation flush thread of execution. If no services are active, the operation flush 160 will perform other appropriate tasks immediately. Note that the operation check_out 156 is operable to unblock the flush, at which point the target object can complete its shut down.

As will be appreciated by those of skill in the art, the usher 152 is suitably adapted for implementation in an object oriented computing system such as a distributed object operating environment. By utilizing synchronization objects such as data structure 168 and the strategy of the present invention, the usher 152 is a self-contained mechanism. That is, a computer service utilizing an usher 152 (and the computer service developer) does not have to concern itself with tasks occurring inside the usher 152. These include tasks such as the serialization of multiple requests and maintaining the integrity of the memory utilized by these multiple requests. Furthermore, the strategy of the present invention lends itself to be implemented through "classes", a common and well-known tool of object oriented programming.

As background, an object "class" is a template from which an object can be created. It is used to specify the behavior and attributes common to all objects of this class. The mechanism by which new classes are defined from existing classes is "inheritance." "Subclasses" of a class inherit operations of their parent class. "Inheritance" is also one mechanism by which reusability is facilitated. In one embodiment of the present invention, the usher 152 is implemented as an object class—the usher class. Thus any object which desires to include the behavior and attributes embodied in the usher 152 (i.e. any object which requires an orderly and predictable shut down strategy) is simply programmed as a member of the usher class. Any objects which are members of the usher class will as a matter of course have all the behavior and attributes as described above in addition to other features the object designer wishes to include.

Note that designing an object as a member of the usher class does not in anyway preclude the object from having other capabilities. Designing an object as a member of the usher class is thus not a limitation. This is demonstrated clearly by the abovementioned principle of "inheritance." Through "inheritance" different classes may be merged into a "subclass" which specifies the behavior and attributes common to all objects of the subclass. New objects can then be designed utilizing this subclass which will have the features of multiple classes.

Figure 6:
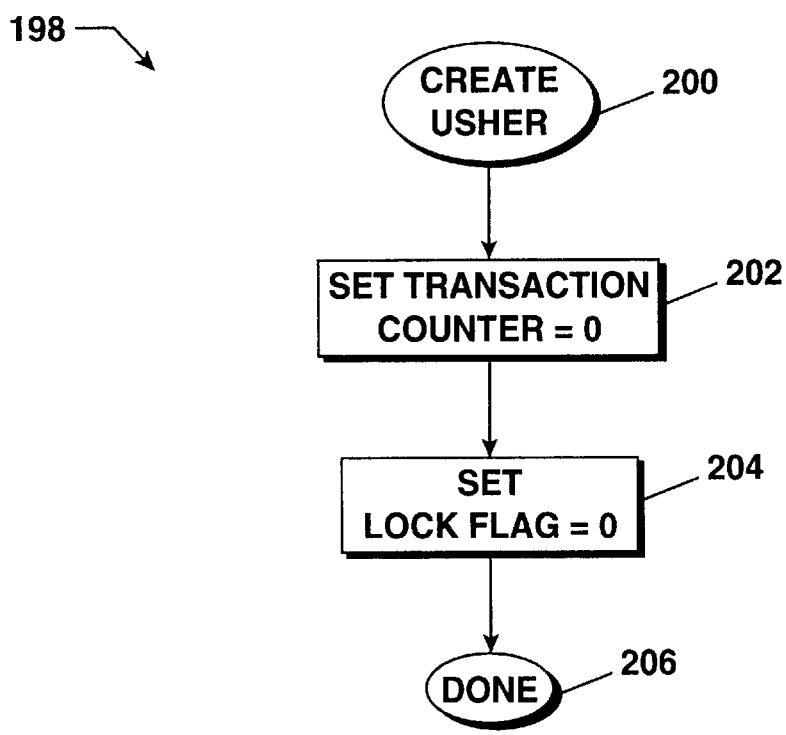
FIG. 6 is a flow chart illustrating one method for creating the usher as shown in FIGS. 4 and 5.

A method 198 for generating an usher 152 in accordance with one embodiment of the present invention will now be described with reference to FIG. 6. In a first step 200, the usher 152 is created. Step 200 is meant to be a generic step which in some embodiments may stretch back as far as the programming of the usher 152 code, creating an usher class, etc. However, in more specific embodiments, step 200 occurs at the point in the initialization of the target object under which the usher 152 resides when the usher 152 begins executing. After step 200, step 202 sets the transaction counter 172 to indicate that no client services are being implemented by the target object. In one suitable embodiment, transaction counter 172 is an integer variable and step 202 sets the transaction counter 172 to zero. In a next step 204, the lock flag is set to indicate that the target object services are available to clients. In one suitable embodiment, the lock flag is a Boolean variable which is set to FALSE (or zero) by step 204. After step 204, the usher 152 is created and initialized and therefore method 198 is complete in a step 206. At this point, the target object is available to provide services to clients.

Figure 7:
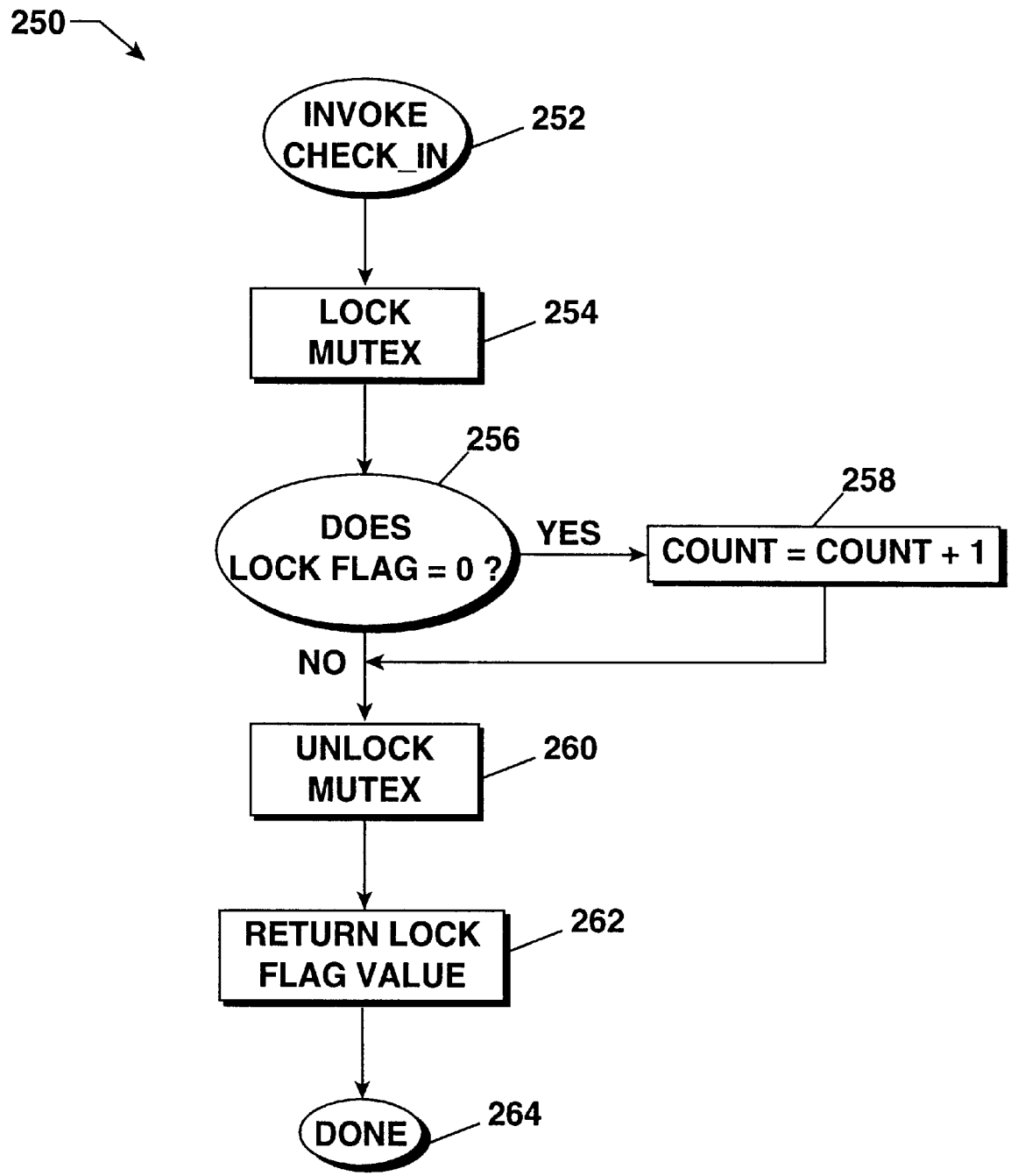
FIG. 7 a flow chart illustrating one method for performing the check_in operation of FIG. 4 in accordance with the present invention.

A method 250 for performing an operation check_in 154 in accordance with one embodiment of the present invention will now be described with reference to FIG. 7. In a first step 252, the target object invokes an operation check_in 154. The target object may invoke the operation check_in 154 upon receiving a request for services from a client. In alternative embodiments, the target object may additionally (or solely) invoke check_in 154 in order to utilize the usher 152 as an internal task accounting system. As described above, the usher 152 performs its own serialization of execution and its own synchronization of memory, thus it may be very handy for ushering internal target object tasks which may be necessary to include in the orderly and predictable shut down. In either case, the usher 152 receives the invocation and in response begins a check_in thread of execution for this specific check_in 154. Next, in a step 254, the check_in thread locks an usher mutex 170. After the check_in thread locks the usher mutex 170, it is said to "own" the mutex. This is because no other threads can access the data elements transaction counter 172 and lock flag 174 which correspond to the mutex 170. Then, in a step 256, the check_in thread determines if the lock flag 174 indicates if services are available to clients. If so, then in a step 258, the transaction counter 172 is incremented by a predetermined number such as unity and then control is passed to a step 260. If the lock flag 174 indicates that services are unavailable to clients, the check_in thread proceeds directly to step 260 wherein the usher mutex 170 is unlocked. Then, in a step 262, the usher 152 returns the value of the lock flag 174 to the target object. In separate embodiments, the tasks of steps 260 and 262 can be performed simultaneously. In any event, after step 262 is complete, the method 250 is complete in a step 264. Note that the target object may provide services to external clients or perform internal tasks based on the value of the lock flag 174.

A method 300 for performing an operation check_out 156 in accordance with one embodiment of the present invention will now be described with reference to FIG. 8. In a first step 302, the target object invokes an operation check_out 156. The target object may invoke this operation upon completing services for a client or (as described above with respect to step 252 of FIG. 7) as an internal task accounting strategy. An usher 152 receives this invocation and in response begins a check_out thread of execution for this specific check_out 156. Next, in a step 304, the check_out thread locks the usher mutex 170. Note that if the method of FIG. 7 (as well as the methods described below with reference to FIGS. 9–11) is currently operating (e.g. a check_in thread is executing) it is possible that the check_in thread owns the usher mutex 170. Generally in cases such as this, the thread requesting a mutex will block until the mutex is free and then try again to lock it. The queuing of threads requesting a mutex is typically handled by the computer operating system and is well known to those skilled in the art.

Figure 8:
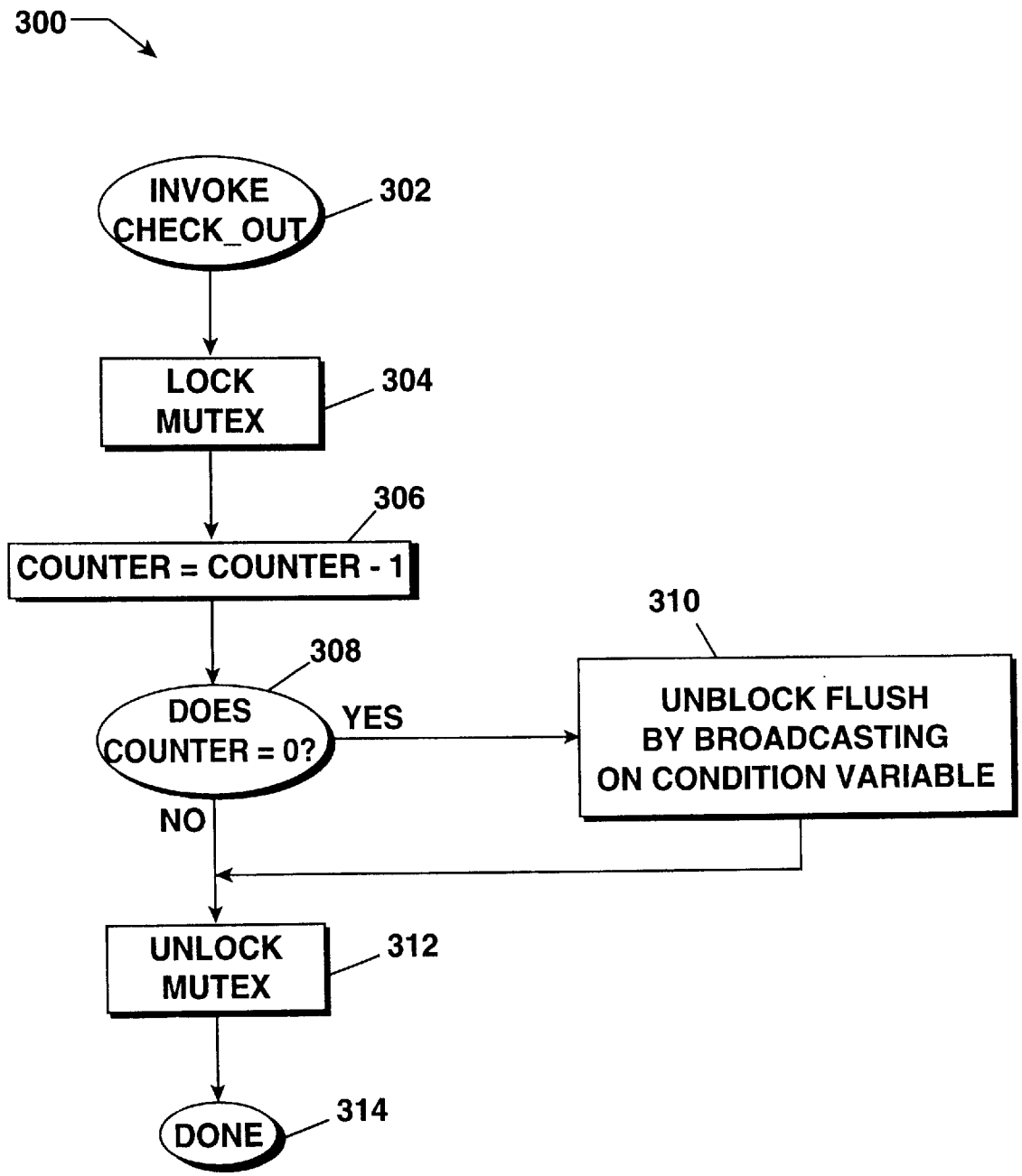
FIG. 8 is a flow chart illustrating one method for performing the check_out operation of FIG. 4 in accordance with the present invention.

Continuing the method 300 of FIG. 8, in a next step 306, the check_out thread decrements the transaction counter by a predetermined number such as unity. In order to maintain consistency, the predetermined number used in step 306 should equal the predetermined number used in step 258 of FIG. 7. Next, in a step 308, the check_out thread evaluates the transaction counter 172. If the transaction counter 172 indicates that the target object is performing services for clients, then control proceeds directly to a step 312. On the other hand, if the transaction counter 172 indicates that the target object is not performing services for clients, then control proceeds to a step 310 where an unblock flush command is executed. In one embodiment, the unblock flush is accomplished by broadcasting on an usher condition variable 169. The unblock flush essentially enables the target object to complete any shut down procedures which may be waiting for all client services to complete. However, there may be no shut down requests pending and thus normal target object execution may continue. In any event, in a subsequent step 312, the check_out thread unlocks the usher mutex 170 and then in a step 314 the method 300 is complete.

Figures 9, 10:
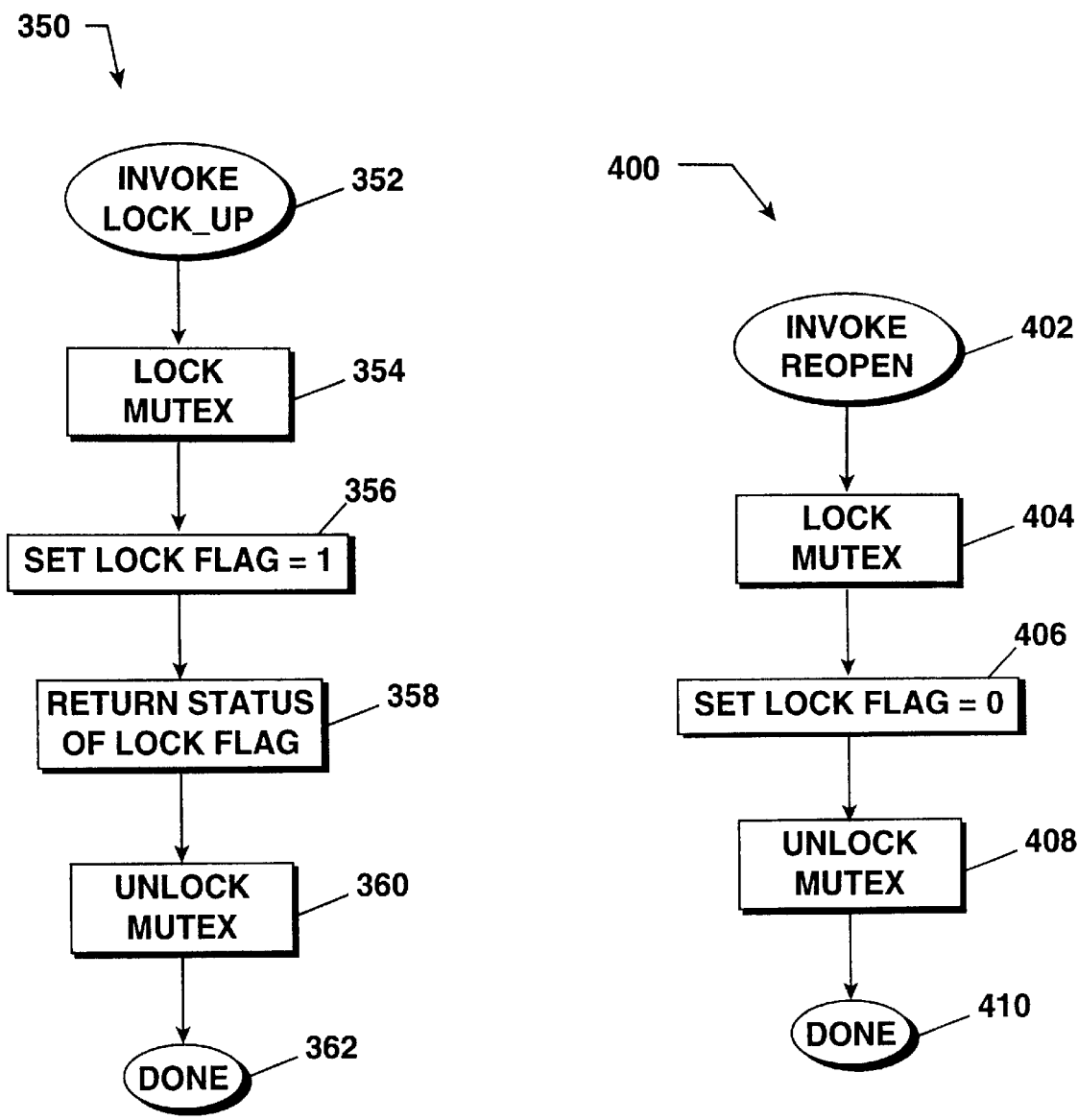
FIG. 9 is a flow chart illustrating one method for performing the lock_up operation of FIG. 4 in accordance with the present invention.
FIG. 10 is a flow chart illustrating one method for performing the reopen operation of FIG. 4 in accordance with the present invention.

A method 352 for performing an operation lock_up 158 in accordance with one embodiment of the present invention will now be described with reference to FIG. 9. The method of FIG. 9 begins when a target object invokes an operation lock_up 158 in a step 352. The target object may perform this call in response to a client (such as the operating system) requesting that the target object shut down or simply discontinue service. Additionally, a target object may self initiate a shut down for a variety of reasons. By way of example, the target object may include an expiration date beyond which it may not provide services. In any case, an usher 152 receives the lock_up 158 invocation and begins executing a lock_up thread in step 352. In a step 354, the lock_up thread locks an usher mutex 170. Then, in a step 356, the lock_up thread sets the lock flag 174 to indicate that the target object is not accepting requests for services. This step relates to the check_in method 250 of FIG. 7 in that once the lock flag 174 is locked, no clients can check in and receive services of the target object. Subsequent to step 356, the lock_up thread returns the status of the lock flag 174 to the target object. The target object may evaluate the status of the lock flag 174 to insure a proper operation lock_up 158 was performed or (perhaps more typically) ignore the status of the lock flag 174. Additionally the target object may broadcast to other entities in the distributed object operating environment that it is no longer providing services. In other embodiments, the step 358 is simply not performed. Following step 358, the lock_up thread unlocks the usher mutex 170 and in a step 362 the method 350 is complete.

One method 400 for performing an operation reopen 162 in accordance with one embodiment of the present invention will now be described with reference to FIG. 10. Note that the operation reopen 162 is an optional operation and adds more functionality to the strategy of the present invention. In a first step 402 a target object invokes an operation reopen 162. The target object may invoke this operation for a variety of reasons. By way of example, the target object may have previously required sole use of its resources in order to perform a specific internal task and thus self initiated an operation lock_up 158. Then, after performing the specific internal task, the target object may open itself up to clients once again through the operation reopen 162. As another example, an operating system may have requested the target object to shut down and now, prior to an operation flush 160, may be requesting the object to (re)start. In any event, in the step 402, an usher 152 receives a reopen 162 invocation and begins executing a reopen thread. Subsequent to step 402, in a step 404, the reopen thread locks the usher mutex 170. Next in a step 406, the reopen thread sets a lock flag 174 to indicate that the target object is available to provide services. Note that this step essentially undoes the lock_up method 350 of FIG. 9. Then in a step 408 the reopen thread unlocks the usher mutex 170 and the method 400 is complete in a step 410.

Figure 11:
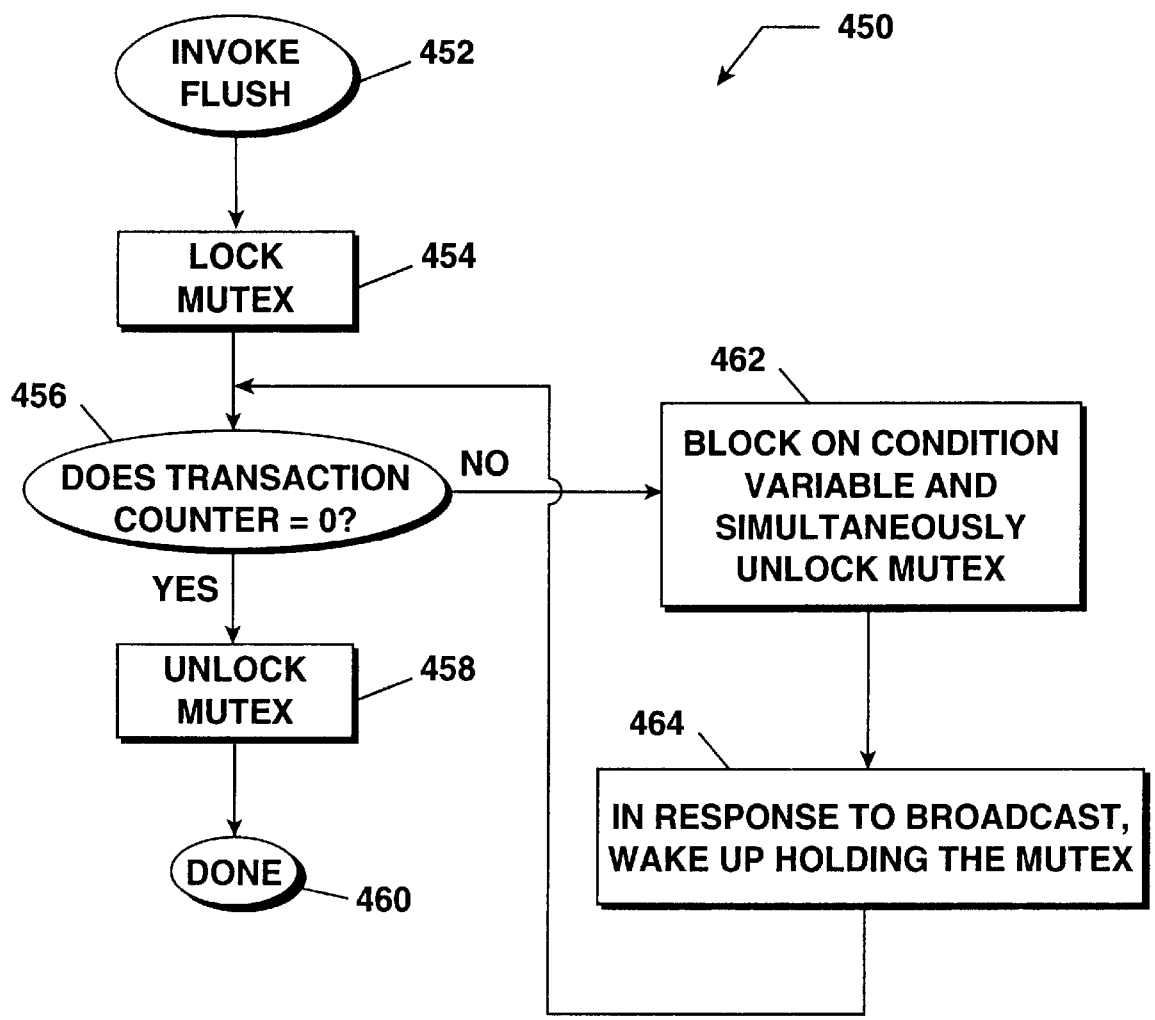
FIG. 11 is a flow chart illustrating one method for performing the flush operation of FIG. 4 in accordance with the present invention.

One method 450 for performing an operation flush 160 in accordance with one embodiment of the present invention will be described now with reference to FIG. 11. In a first step 452 a target object invokes an operation flush 160 of an usher 152. The operation flush 160 is performed typically as a final command step in the shut down of the target object. That is, while there may be other pending tasks to perform such as completing client requested services, the operation flush 160 is the last initiated step. So, in step 452 an usher 152 receives an invocation from the target object and begins executing a flush thread. Next, in a step 454, the flush thread locks an usher mutex 170. Then, in a step 456, the flush thread 152 evaluates the transaction counter 172. If the transaction counter 172 indicates that no client services are being performed, then in a step 458 the flush thread unlocks the usher mutex 170 and the flush method 450 is complete in a step 460. However, if the transaction counter indicates that client services are still active, the flush thread branches to a step 462. In step 462, the flush thread blocks itself on an usher condition variable 169, simultaneously unlocking the usher mutex 170. At this point, the flush thread is in a wait state. Subsequently, in a step 464, in response to a broadcast on the condition variable 169, the flush thread wakes up owning the usher mutex 170. Then the flush thread returns to step 456 to evaluate the transaction counter 172 and proceed accordingly. In any event, once the unlock mutex step 458 finishes, the method 450 is complete in a step 460. However, step 460 may also include a variety of tasks which the target object performs as part of shut down. Suitable tasks include broadcasting to the operating system that the target object is prepared for shut down and self-elimination.

In examining the apparatus of FIGS. 4 and 5 along with the methods of FIGS. 6–11, it is apparent that the methods and apparatus of the present invention are intimately related and can be woven together into a generic paradigm representing a variety of embodiments of the present invention. One suitable way of illustrating this generic paradigm is a state diagram.

A state diagram 500 illustrating some of the possible states for an usher 152 in accordance with the present invention will be discussed now with reference to FIG. 12.

As will be appreciated by those of skill in the art, state diagrams are useful for gaining insight into process execution but do not necessarily exhaustively define the process diagrammed. For example, a given entity may have more than one state diagram, each diagram being accurate in its own way. In addition, a completely thorough state diagram may (through too many details) obscure the information which it is trying to convey. In light of this, the applicant submits that the state diagram 500 of FIG. 12 and the following description are not to be interpreted as fully encompassing all possible states and/or transitions that an usher in accordance with the present invention may exhibit. Furthermore, the state diagram 500 of FIG. 12 should in no way be construed as limiting, but rather is presented to help explain the present invention.

Figure 12:
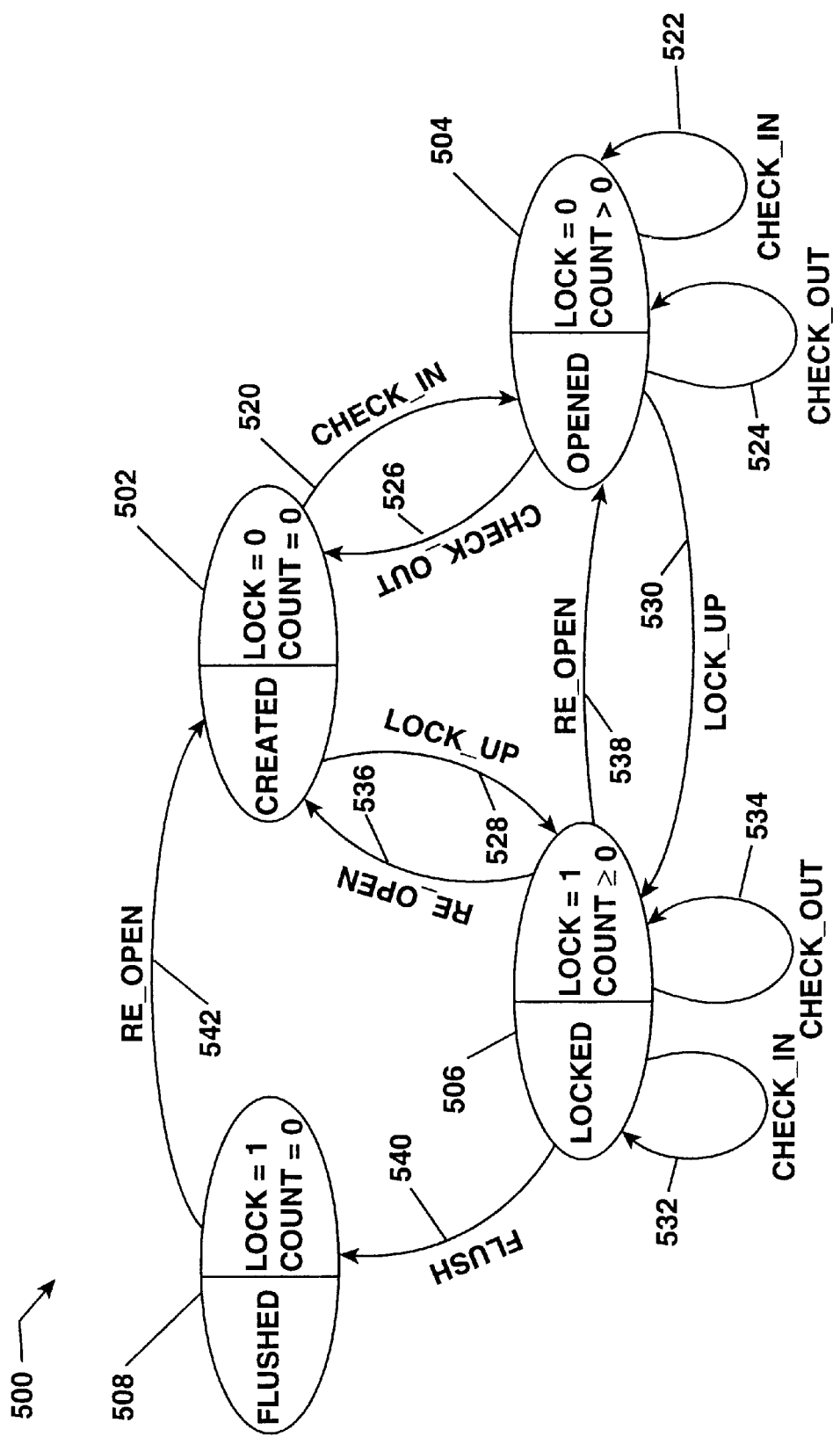
FIG. 12 is a state diagram showing a few possible states of the usher of FIGS. 4 and 5 in accordance with the present invention.

The usher state diagram 500 of FIG. 12 includes the states created 502, opened 504, locked 506, and flushed 508. Created 502 corresponds to an usher 152 executing, not locked (i.e. available server clients), and no client services currently being performed. Upon a first check_in 520, the usher 152 transitions to opened 504. The state opened 504 corresponds to the usher 152 executing, not locked, and currently performing client services. In a opened check_in 522, the usher 152 transitions in the sense that the transaction counter 172 will increment in response to a new client be serviced, but the usher loops back to the state opened 504. In a first opened check_out 524, the usher transitions in the sense that the transaction counter 172 is decremented in response to a client's requested services being completed, but in this case the transaction counter 172 indicates that client services are still in process and therefore the usher loops back to the state opened. However, in a second opened check_out 526 the transaction counter indicates that no client services are being performed and therefore the usher 152 transitions back to the state created 502.

In states created 502 and opened 504, an operation lock_up 158 will generate transitions created lockup 528 and opened lockup 530. Each of these transition the usher 152 into the state locked 506. From the state locked 506, a locked check_in 532 transitions the usher back into the state locked 506 in response to a new client request for services. However, in contrast to opened check_in 522 or the created check_in 520, when the usher 152 is in locked 506, the transaction counter 172 is not incremented and services are not provided to the new client. A locked check_out 534 will also transition the usher 152 back into the state locked 506 and the transaction counter 172 is decremented as one client's requested services have been completed. If an operation reopen 162 is invoked when the usher is in locked 506, one of two transitions will occur. The first locked reopen 536 occurs when the transaction counter 172 indicates that no client services are currently being performed. Accordingly, the first locked reopen 536 transitions the usher 152 into the state created 502. The second locked reopen 538 occurs when the transition counter 174 indicates that client services are currently being performed. Accordingly, the second locked reopen 538 transitions the usher 152 into the state opened 504.

When an operation flush 160 is invoked upon the usher 152, the usher 152 will wait until the transition counter indicates that no client services are being performed. Then in a locked flush 540, the usher 152 will transition to the flushed state 508. In the state flushed 508, the target object may be deleted with out adversely effecting clients, maintained in an idle state, or reopened. In the reopened case, the usher 152 transitions from the state flushed 508 into the state created 502 via a flushed reopen 542.

Although only a few embodiments of the present invention have been described, it should be understood that the present invention may be embodied in many other specific forms without departing from the spirit or scope of the invention. For example, other mechanisms for synchronizing threads of execution are contemplated. One instance would utilize read/write synchronization objects rather than mutexes. In this instance, the variables in memory could be read concurrently by different threads but only one thread at a time could write to the shared variables. The modifications necessary to implement the present invention using read/write synchronization objects will be apparent to those skilled in the art of concurrent programming.

In further embodiments, the usher device is independent of the server (server object, server process, etc.) for which it provides a shut down mechanism. The server can make calls directly to the usher device which otherwise follows the described methods of the present invention. In one specific embodiment, the usher device is a server object having all the characteristics of a distributed object as described herein.

As will be appreciated by those skilled in the art, the methods and apparatus disclosed herein are suitable for a variety of computer servers. Therefore, the present examples are to be considered as illustrative and not restrictive, and the invention is not to be limited to the details given herein, but may be modified within the scope of the appended claims.

I claim:

1. A computer implemented method for managing clients of a server that is arranged to provide services to a plurality of clients, the server being responsive to service requests from various clients and deactivation requests, the method including the computer controlled steps of:

(a) in response to each service request, determining only once for a particular service request whether the server is in a locked state, wherein when the server is in the locked state the server will reject and not handle the service request and thus the server will never perform a requested service corresponding to the particular service request if the particular service request was received while the server is in the locked state, but, when the server is in an unlocked state, the server will accept and subsequently handle the service request, and incrementing a transaction counter by a predetermined value when it is determined that the server is in the unlocked state, the transaction counter being indicative of the number of service requests actively utilizing the server;

(b) performing the requested service when it is determined in step (a) that the server is in the unlocked state;

(c) decrementing the transaction counter by the predetermined value after each requested service having a corresponding service request that was accepted has been completed;

(d) in response to a deactivation request, setting the server to the locked state and checking the transaction counter to determine whether there are any active service requests prior to deactivating the server; and (e) when it is determined that there is at least one active service request, waiting to deactivate the server until it is determined based on the transaction counter that all of the active service requests have been completed, wherein the server is deactivated only after it is determined that all of the active service requests have been completed, whereby when the server is to be deactivated, new service requests are refused since the server is in the locked state and existing service requests are completed prior to deactivation.

2. A computer implemented method as recited in claim 1 wherein the server is a server computer process.

3. A computer implemented method as recited in claim 1 wherein the server is a server object.

4. A computer implemented method as recited in claim 1 wherein the server is a computer service including a plurality of objects.

5. A computer implemented method as recited in claim 1 wherein in response to each service request, the server invokes a check in operation which accomplishes the locked state determining and the transaction counter incrementing steps.

6. A computer implemented method as recited in claim 5 wherein the state of the server is indicated by a lock flag.

7. A computer implemented method as recited in claim 6 wherein the check in operation further comprises a computer controlled step of returning said state of said lock flag to said server.

8. A computer implemented method as recited in claim 6 wherein said check in operation further comprises the computer controlled steps of:

prior to both the locked state determining and the transaction counter incrementing steps, locking a mutex associated with said lock flag and said transaction counter such that said lock flag and said transaction counter are protected from all other computer threads of execution; and subsequent to both the locked state determining and the transaction counter incrementing steps, unlocking said mutex.

9. A computer implemented method as recited in claim 1 wherein at the completion of each requested service, the server invokes a check out operation which accomplishes the transaction counter decrementing step.

10. A computer implemented method as recited in claim 9 wherein the check out operation further comprises the steps of:

prior to said transaction counter decrementing step, locking a mutex associated with said transaction counter such that said transaction counter is protected from all other computer threads of execution;

subsequent to said transaction counter decrementing step, determining if said transaction counter indicates that there are active service requests;

broadcasting on a condition variable associated with said mutex when it is determined that there are no active service requests; and subsequent to said transaction counter decrementing step, unlocking said mutex.

11. A computer implemented method as recited in claim 1 wherein in response to a deactivation request, the server invokes a lock up operation which accomplishes the setting the server to the locked state step.

12. A computer implemented method as recited in claim 11 wherein the state of the server is indicated by a lock flag.

13. A computer implemented method as recited in claim 12 wherein the lock up operation accomplishes the setting the server to the locked state step by setting the lock flag.

14. A computer implemented method as recited in claim 13 wherein the lock up operation further comprises the computer controlled steps of:

prior to said setting the server to the locked state step, locking a mutex associated with said lock flag such that said lock flag is protected from all other computer threads of execution; and subsequent to said setting the server to the locked state step, unlocking said mutex.

15. A computer implemented method as recited in claim 1 wherein in response to a deactivation request, the server invokes a flush operation which performs the checking the transaction counter step.

16. A computer implemented method as recited in claim 15 wherein when it is determined that there is at least one active service request the flush operation further comprises the computer controlled steps of:

blocking a thread of execution associated with said flush operation on a condition variable associated with said transaction counter; and in response to a broadcast on said condition variable, unblocking said flush operation thread of execution.

17. A computer implemented method as recited in claim 15 wherein when it is determined that there are no active server requests, the flush operation further comprises a computer controlled step of notifying the server that the flush operation is complete.

18. A computer implemented method as recited in claim 15 wherein when it is determined that there are no active server requests, the flush operation further comprises a computer controlled step of deleting the server.

19. A computer implemented method as recited in claim 15 wherein the flush operation further comprises the computer controlled steps of:

prior to said checking the transaction counter step, locking a mutex associated with said transaction counter such that said transaction counter is protected from all other computer threads of execution; and subsequent to said checking the transaction counter step, unlocking said mutex.

20. A computer implemented method as recited in claim 1 further including a step of setting the server to the unlocked state in response to an activation request.

21. A computer implemented method as recited in claim 20 wherein said server invokes a reopen operation which accomplishes the setting the server to the unlocked state step.

22. A computer implemented method as recited in claim 21 wherein the state of the server is indicated by a lock flag.

23. A computer implemented method as recited in claim 22 wherein the reopen operation comprises the computer controlled step of setting the lock flag to indicate that the state of the server is unlocked.

24. A computer implemented method as recited in claim 23 wherein the reopen operation further comprises the computer controlled steps of:

prior to said step of setting the lock flag, locking a mutex associated with said lock flag such that said lock flag is protected from all other computer threads of execution; and subsequent to said step of setting the lock flag, unlocking said mutex.

25. A computer implemented method for managing clients of a server that is arranged to provide services to a plurality of clients, the server being responsive to service requests from various clients and deactivation requests, the method including the computer controlled steps of:

in response to each service request, invoking a check in operation, the check in operation including the computer controlled steps of determining only once for a particular service request whether the server is in a locked state, wherein when the server is in the locked state the server will reject and not handle the service request and thus the server will never perform a requested service corresponding to the particular service request if the particular service request was received while the server is in the locked state, but, when the server is in an unlocked state the server will accept and subsequently handle the service request, and incrementing a transaction counter by a predetermined value when it is determined that the server is in the unlocked state, the transaction counter being indicative of the number of service requests actively utilizing the server;

performing the requested service when it is determined that the server is in the unlocked state;

in response to a service request being completed, invoking a check out operation that decrements the transaction counter by the predetermined value;

in response to a deactivation request, invoking a lock up operation that sets the server to the locked state, wherein in the locked state the server completes all active service requests but rejects new service requests;

in response to a deactivation request, performing any necessary deactivation functions and then invoking a flush operation that checks the transaction counter to determine whether there are any active service requests prior to deactivating the server; and when it is determined that there is at least one active service request, waiting to deactivate the server until after it is determined based on the transaction counter that all of the active services have been completed, whereby when the server is to be deactivated, new service requests are refused and existing service request are completed prior to deactivation.

26. A computer implemented method as recited in claim 25 wherein the server is selected from the group consisting of a server process, a server object and a computer service comprising a plurality of objects.

27. A computer implemented method as recited in claim 25 wherein the state of the server is indicated by a lock flag.

28. A computer implemented method as recited in claim 27 wherein the check in operation further comprises the computer controlled step of returning said state of said lock flag to said server.

29. A computer implemented method as recited in claim 28 wherein the lock up operation accomplishes the setting the server to the locked state step by setting the lock flag.

30. An usher device for use on a computer system, said usher device being arranged to manage a plurality of clients of a computer server and assist in an orderly shutdown of said computer server, said usher device comprising:

a transaction counter indicative of the number of client service requests actively utilizing said computer server, a client service request that is actively utilizing said computer server being a client service request that has been accepted by the usher but has not yet been completed by the computer server;

a check in device operable to increment said transaction counter by a predetermined value;

a check out device operable to decrement said transaction counter by said predetermined value;

a lock up device operable to lock up said computer server such that when said computer server is locked up it does not accept new client service requests but continues performing any active service requests, whereby said computer server will never perform new client service requests received while the computer server is locked up; and a flush device operable to shut down said usher device when said computer server is locked up and after waiting until said transaction counter indicates that there are no active service requests, wherein the flush device is operable to deactivate the server when it is determined based on the transaction counter that there are not active service requests.

31. An usher device as recited in claim 30 wherein said flush device is further operable to broadcast to said computer server when it has completed its functions.

32. An usher device as recited in claim 30 further comprising a reopen device operable to unlock said computer server such that said computer server can perform services for said plurality of clients.

33. An usher device as recited in claim 30 wherein said computer server is a computer process.

34. An usher device as recited in claim 30 wherein said computer server is an object.

35. An usher device as recited in claim 30 wherein said computer server is a computer service comprising a plurality of objects arranged to work together to provide services to said plurality of clients.

36. An usher device as recited in claim 30 wherein said usher device is resident within said computer server.

37. An usher device as recited in claim 30 wherein said usher device is resident external to said computer server.

38. An usher device as recited in claim 30 wherein said lock up device includes a lock up flag indicating the state of the computer server.

39. An usher device as recited in claim 38 wherein said lock up device is arranged to set said lock up flag to indicate that the state of the computer server is locked.

40. An usher device as recited in claim 38 further including a mutex associated with said transaction counter and said lock flag.

41. An usher device as recited in claim 40 wherein said check in device is further operable to:

lock said mutex such that said transaction counter and said lock flag are protected from all other threads of execution;

determine the state of said lock flag and, when the state of said lock flag indicates that said computer server is unlocked, increment said transaction counter by said predetermined value; and unlock said mutex.

42. An usher device as recited in claim 30 further comprising a mutex associated with said transaction counter.

43. An usher device as recited in claim 42 wherein said check out device is further operable to:

lock said mutex such that said transaction counter is protected from all other threads of execution; and unlock said mutex.

44. An usher device as recited in claim 40 wherein said lock up device is further operable to:

lock said mutex such that said lock flag is protected from all other threads of execution; and unlock said mutex.

45. An usher device as recited in claim 44 further including a condition variable associated with said transaction counter.

46. An usher device as recited in claim 45 wherein when said transaction counter indicates that there is at least one active service request, said flush device responds by blocking a thread of execution associated with said flush device on said condition variable.

47. An usher device as recited in claim 46 wherein when said transaction counter transitions from indicating that there is one active service request to indicating that there are no active service requests, said check out device responds by broadcasting a thread wakeup call on said condition variable.

48. An usher device as recited in claim 47 wherein said flush device responds to said thread wakeup call by unblocking said thread of execution associated with said flush device.

49. A computer system comprising:

a central processing unit;

a memory device accessed by said central processing unit; and an usher device as recited in claim 48.

50. A computer system as recited in claim 49 further including an input/output device coupled to at least one of central processing unit and said memory device.

51. A distributed object operating environment comprising:

a plurality of computers as recited in claim 50; and a computer network interconnecting said plurality of computer systems via the input/output device of each one of said plurality of computer systems.

* * * * *